(12) United States Patent
Kumarasamy et al.

(10) Patent No.: US 7,529,233 B2
(45) Date of Patent: May 5, 2009

(54) INTERWORKING PROGRESS INDICATOR IN SIP-PSTN NETWORK

(75) Inventors: Parameswaran Kumarasamy, San Jose, CA (US); Manjunath Bangalore, San Jose, CA (US); Sanjay Sinha, Apex, NC (US); Kavithadevi Parameswaran, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 436 days.

(21) Appl. No.: 11/510,215

(22) Filed: Aug. 24, 2006

(65) Prior Publication Data

US 2008/0112397 A1 May 15, 2008

(51) Int. Cl.
*H04L 12/66* (2006.01)
(52) U.S. Cl. .................... 370/352; 370/395.2; 370/401; 370/410; 370/467; 709/249
(58) Field of Classification Search ........................ None
See application file for complete search history.

(56) References Cited

U.S. PATENT DOCUMENTS 6,865,266 B1 * 3/2005 Pershan ................. 379/221.13
6,965,614 B1 * 11/2005 Osterhout et al. ........... 370/466
7,436,946 B1 * 10/2008 Peterson ................ 379/212.01
2002/0064267 A1 * 5/2002 Martin et al. .......... 379/201.01

OTHER PUBLICATIONS

A. Vemuri, "Session Initiation Protocol for Telephone (SIP-T): Context and Architectures", Networking Working Group, 22 pages, Sep. 2002.
ITU-T Telecommunication Standardization Sector of ITU, Series Q: Switching and Signalling, Digital subscriber Signalling System No. 1—Network layer, ISDN user-network interface layer 3 specification for basic call control, Table of Contents and Section 5.3, 17 pages, Q.931, May 1998.

* cited by examiner

*Primary Examiner*—Wing F Chan
*Assistant Examiner*—Brian Roberts
(74) *Attorney, Agent, or Firm*—Brian N. Young; Trellis IP Law Group, PC (57) ABSTRACT

In a particular embodiment, a disconnect message with a progress indicator may be received in a PSTN protocol at a gateway. The gateway determines if the disconnect message includes a progress indicator. The gateway then generates a SIP message with a reason indicator that indicates the SIP message is mapped from a disconnect message that includes the progress indicator. The SIP message is then sent to a second gateway. The second gateway determines that the SIP message should be interworked to a disconnect message. The second gateway uses the reason indicator in the SIP message to determine this. Accordingly, the second gateway sends a disconnect with progress indicator to a second PBX. This allows the second PBX the option to either listen to an in-band announcement or to disconnect without listening to the in-band announcement.

18 Claims, 8 Drawing Sheets

302 — SIP/2.0 183 Session Progress
304 — From: <sip:555@1.5.38.63>;tag=48208254-1950
306 — To: <sip:666@1.5.38.62>;tag=431E0130-1212
308 — Call-ID: A891A51-642411D6-80188606-7E915E93@1.5.38.63
       Reason-header: Disconnect — 310

312 {
  c=IN IP4 1.5.38.62
  m=audio 19146 RTP/AVP 18
  a=rtpmap:18 G729/8000
}

INTERWORKING PROGRESS INDICATOR IN SIP-PSTN NETWORK

BACKGROUND

Particular embodiments generally relate to telecommunications and more specifically to processing a disconnect message with a progress indicator in a SIP-PSTN network.

In a SIP-PSTN network, a disconnect message with progress indicator (PI) e.g., disconnect (PI=8) may be sent by a PSTN device to a gateway. The gateway may communicate with another gateway using a different protocol, such as session initiation protocol (SIP). When the disconnect (PI=8) message is received, the gateway maps the disconnect (PI=8) to a 183 session in progress SIP message. The 183 session in progress SIP message is then sent to another gateway. That gateway maps the 183 session in progress message to a progress (PI=8) message.

The progress (PI=8) message is different from a disconnect (PI=8) message. The disconnect (PI=8) message indicates that a disconnect is desired but an in-band announcement is being provided and thus establishment of a voice path is requested. For example, this may occur when a subscriber is busy and a private branch exchange (PBX) wants to send a message indicating the subscriber is busy. When a disconnect (PI=8) message is received, a receiving PBX has the option to establish a voice path and listen to an in-band announcement or disconnect the call. In contrast, the progress (PI=8) message is just a request to establish a voice path. Because of the interworking that occurs between PSTN to SIP, the disconnect (PI=8) message is not mapped to the disconnect (PI=8) message after interworking from PSTN to SIP and back to PSTN. Accordingly, the PBX receiving the progress (PI=8) message does not know a disconnect (PI=8) message was sent. Thus, the option to disconnect is not provided to the PBX.

BRIEF DESCRIPTION OF THE DRAWINGS

FIG. 6 illustrates an example call flow in which an in-band announcement is listened to.

FIG. 7 illustrates an example call flow in which an in-band announcement is not listened to.

DESCRIPTION OF EXAMPLE EMBODIMENTS

Particular embodiments provide techniques for processing a disconnect message with a progress indicator. In a particular embodiment, a disconnect message with a progress indicator may be received in a PSTN protocol at a gateway. The message may be received from a private branch exchange (PBX) or any other PSTN device. The gateway determines if the disconnect message includes a progress indicator. The gateway then generates a SIP message with a reason indicator that indicates the SIP message is mapped from a disconnect message that includes the progress indicator.

The SIP message is then sent to a second gateway. The second gateway determines that the SIP message should be interworked to a disconnect message. The second gateway uses the reason indicator in the SIP message to determine this. Accordingly, the second gateway sends a disconnect with progress indicator to a second PBX. This allows the second PBX the option to either listen to an in-band announcement or to disconnect without listening to the in-band announcement.

Figure 1:
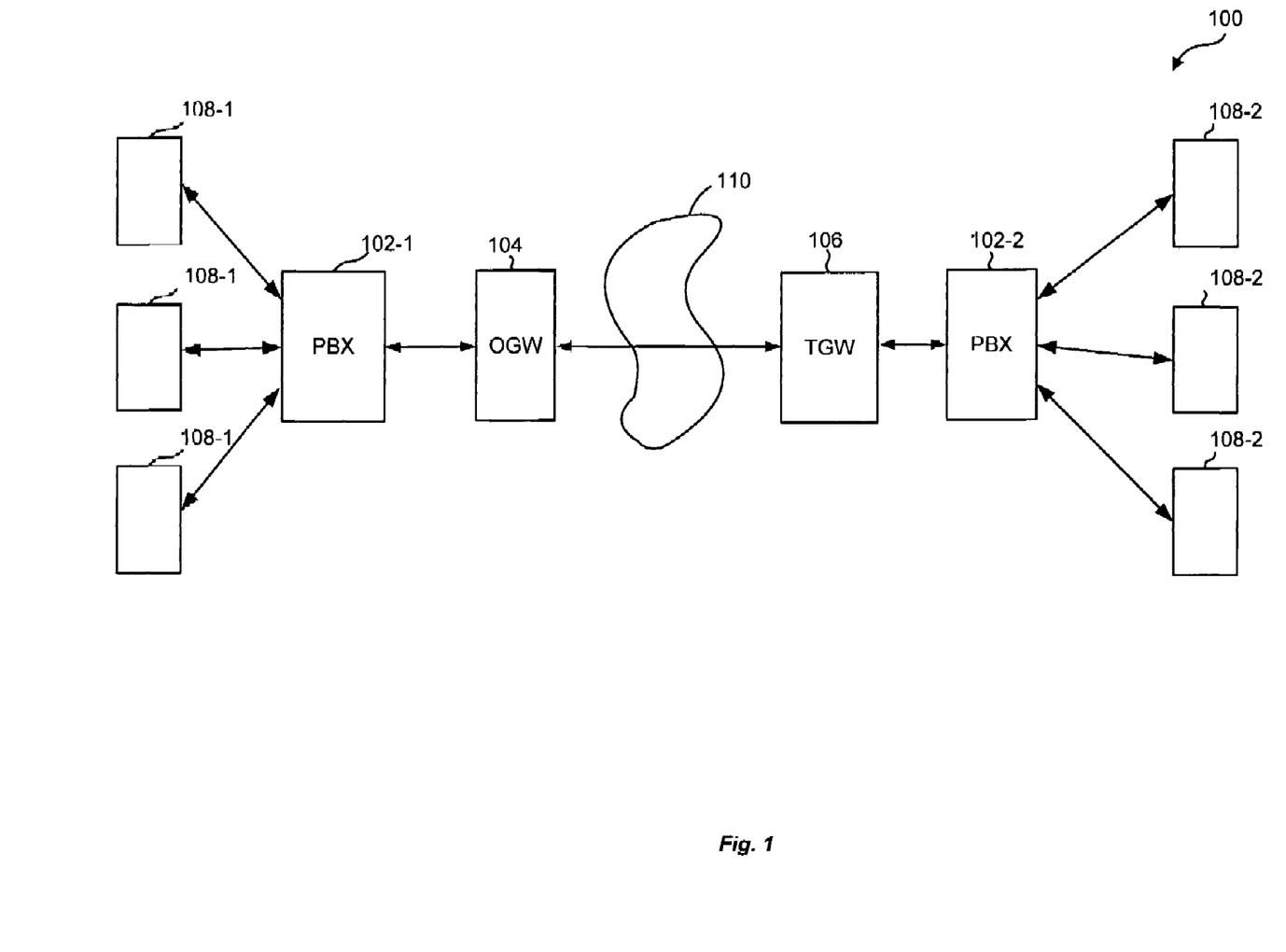
FIG. 1 illustrates an example system for providing SIP-PSTN interworking.

FIG. 1 illustrates an example system 100 for providing SIP-PSTN interworking. As shown, PBXs 102, originating gateway 104, terminating gateway 106, end devices 108, and network 110 are provided.

End devices 108 may be any devices that can participate in a communication. For example, end devices 108 may be telephones, public switch telephone network (PSTN) devices, or any other devices that can initiate PSTN (e.g., Q.931) signaling.

Originating gateway 104 may be any network device configured to manage communications with end devices 108-1. In a particular embodiment, gateway 104 manages a set of end devices 108. Originating gateway 104 may be the gateway that originates a communication.

Terminating gateway 106 may be any network device configured to manage communications with end devices 108-2. Terminating gateway 106 may be the gateway that receives a communication from originating gateway 104. Terminating gateway 106 may then send a communication to an end device 108-2. Although originating gateway 104 and terminating gateway 106 are referred to as "originating" and "terminating", it will be understood that communications may flow in both directions. Thus, originating gateway 104 and terminating gateway 106 may originate and terminate communications.

Network 110 may be any network. For example, network 110 may be an IP network. Session initiation protocol (SIP) may be used to send SIP messages between originating gateway 104 and terminating gateway 106. Although SIP is described, it will be understood that other protocols may be appreciated.

End devices 108 may attempt to establish a call. For example, end device 108-1 may attempt to establish a call with end device 108-2. The messaging, as will be described in more detail below, goes through PBX 102-1, originating gateway 104, terminating gateway 106, PBX 102-2.

PBXs 102 may be a PSTN devices configured to communicate using the PSTN protocol. Although a PBX is described, it will be understood that other PSTN devices may be used, such as PSTN switches.

When end device 108-1 wants to establish a call with end device 108-2, messaging may be performed to establish the call. However, in some cases, PBX 102-2 may want to send a disconnect message that disconnects the call. In addition to disconnecting the call, PBX 102-2 may also want to play some in-band messages or announcements.

In one example, when the called user/telephone is busy or unable to be reached, a disconnect (PI=8) message may be sent. When a voice path is established as a result of PI=8, the in-band announcement may be played, such as a message indicating that end device 108-2 is busy or is unable to be connected to. In the PSTN protocol, when the disconnect (PI=8) message is received, PBX 102-1 has the option to establish a voice path and listen to the in-band announcement or to disconnect without listening to the in-band announcement. However, when interworking between the PSTN and SIP protocols, conventionally, the disconnect (PI=8) was interworked to a 183 SIP session in progress message, which was interworked to a progress (PI=8) at originating gateway 104. In this case, PBX 102-1 thinks that all that is requested is establishment of a voice path. This is because a progress (PI=8) message has been sent, which just requests the establishment of a voice path. Thus, the voice path is established and the in-band announcement is played.

However, in particular embodiments, a disconnect with progress indicator (PI=8) message is mapped to a 183 session in progress SIP message. Additionally, a reason indicator is included in the 183 session in progress message that indicates a disconnect (PI=8) message was received. For example, a phrase of "disconnect" may be included in a reason header in the 183 session in progress message. Also, the reason indicator may be any other information indicating a disconnect (PI=8) message was received and may also be inserted in other parts of the 183 session in progress message.

When originating gateway 104 receives the 183 session in progress message with the reason indicator, originating gateway 104 can interwork the message to a disconnect (PI=8) message. Accordingly, when PBX 102-1 receives a disconnect (PI=8) message, PBX 102-1 has the option to establish a voice path and listen to the in-band announcement or to disconnect without listening to the in-band announcement. This is different from receiving the progress (PI=8) message in that PBX 102-1 now has options because it knows the disconnect (PI=8) message was sent from PBX 102-2.

Although the following description describes the progress indicator as being "8", it will be recognized that other progress indicators may be used. Further, the description describes a disconnect message as being sent but it will be recognized that other messages may be interworked into a SIP message with a reason indicator. For example, different reason indicators may be used to indicate that different PSTN messages were received with progress indicators. Other messages may be alert, progress, call proceeding messages. Particular embodiments allow the notion of different messages with a progress indicator to be interworked in PSTN-SIP networks using the reason indicator.

Figure 2:
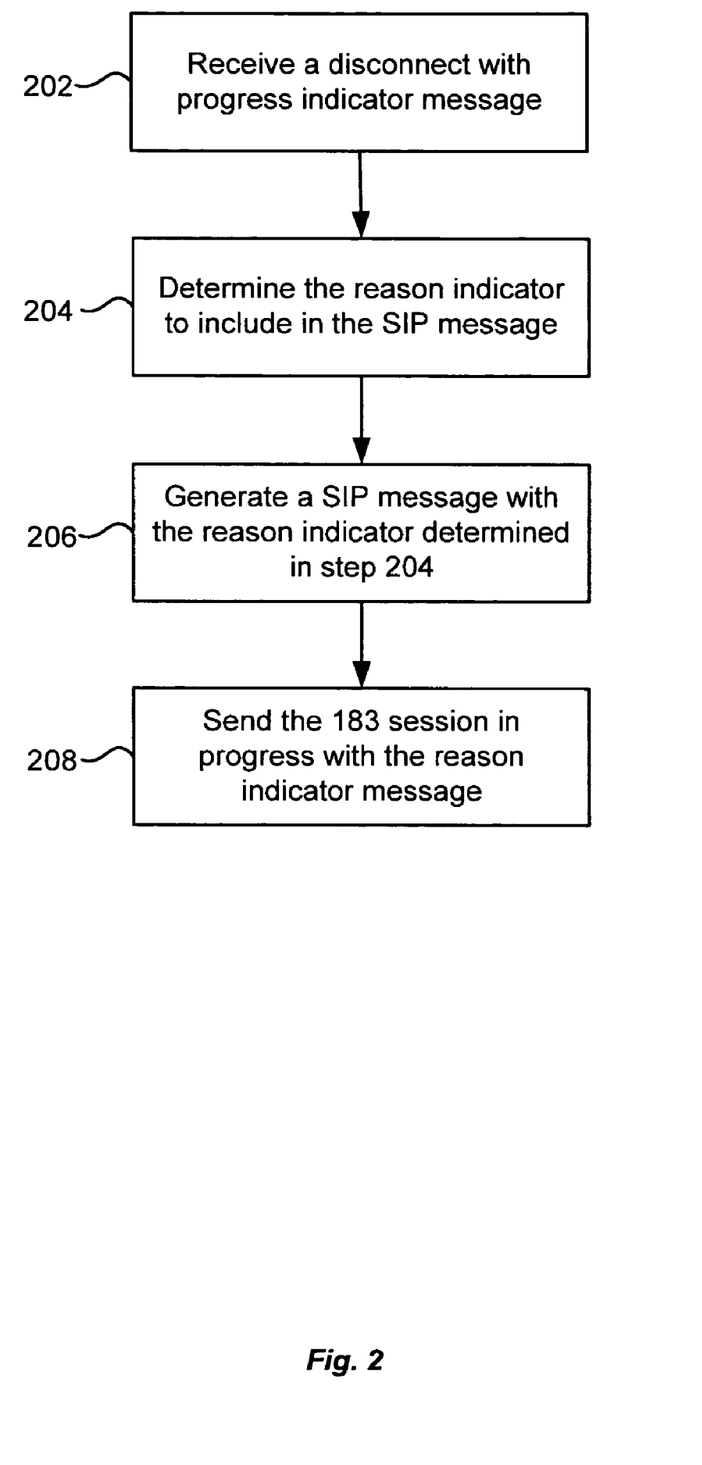
FIG. 2 illustrates an example method for interworking a disconnect message received from a PBX.

FIG. 2 illustrates an example method for interworking a disconnect message received from a PBX. In step 202, terminating gateway 106 receives a disconnect with progress indicator message. As described above, this indicates that a disconnect is requested and PBX 102-2 wants to play a message before disconnecting.

In step 204, terminating gateway 106 determines the reason indicator to include in the SIP message. For example, with a disconnect (PI=8) message, a reason indicator of "disconnect" may be included. Other reason indicators may be included depending on the message received and/or progress indicator included in the message. For example, different reason indicators for other progress indicators, such as 1, 2, and 10, may be used.

In step 206, terminating gateway 106 generates a SIP message with the reason indicator determined in step 204. The reason indicator may indicate that a disconnect message with PI value of 8 has been received. A 183 session in progress SIP message is then generated with the reason indicator included. In a particular embodiment, the reason indicator may be included in a reason header of the 183 session in progress message. This will indicate to originating gateway 104 that a disconnect message with progress indicator of 8 has been received.

In step 208, terminating gateway 106 sends the 183 session in progress with the reason indicator message to originating gateway 104. This message may be sent through network 110 using the SIP protocol.

Figure 3:
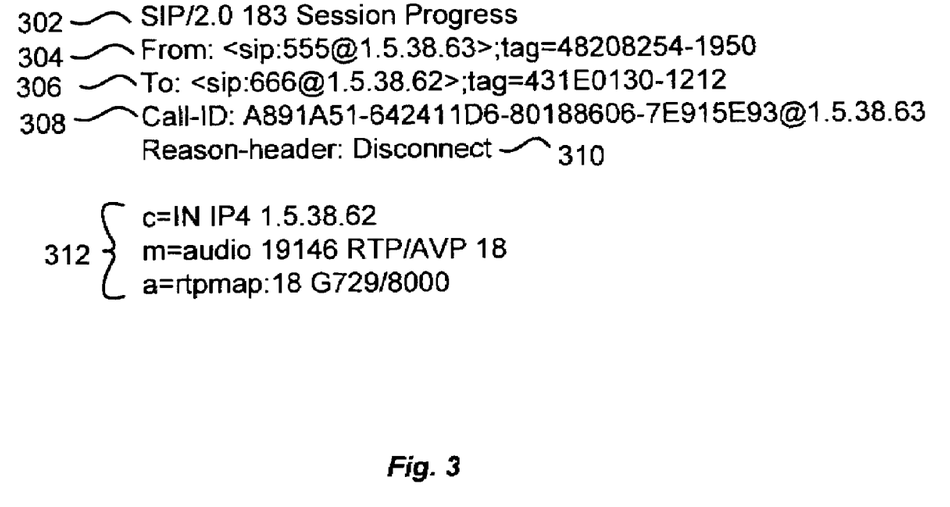
FIG. 3 illustrates an example 183 session-in-progress message.

FIG. 3 illustrates an example 183 session-in-progress message. As shown, a field 302 indicates this is a 183 session in progress message.

A field 304 shows a From header that identifies the originator of the call and a field 306 shows a To header that identifies a recipient of the call. A field 308 includes a call identifier for the message.

In a field 310, a reason indicator has been included in a reason-header. This indicates that a disconnect (PI=8) message has been received.

In a field 312, an SDP provides the session description protocol information.

Figure 4:
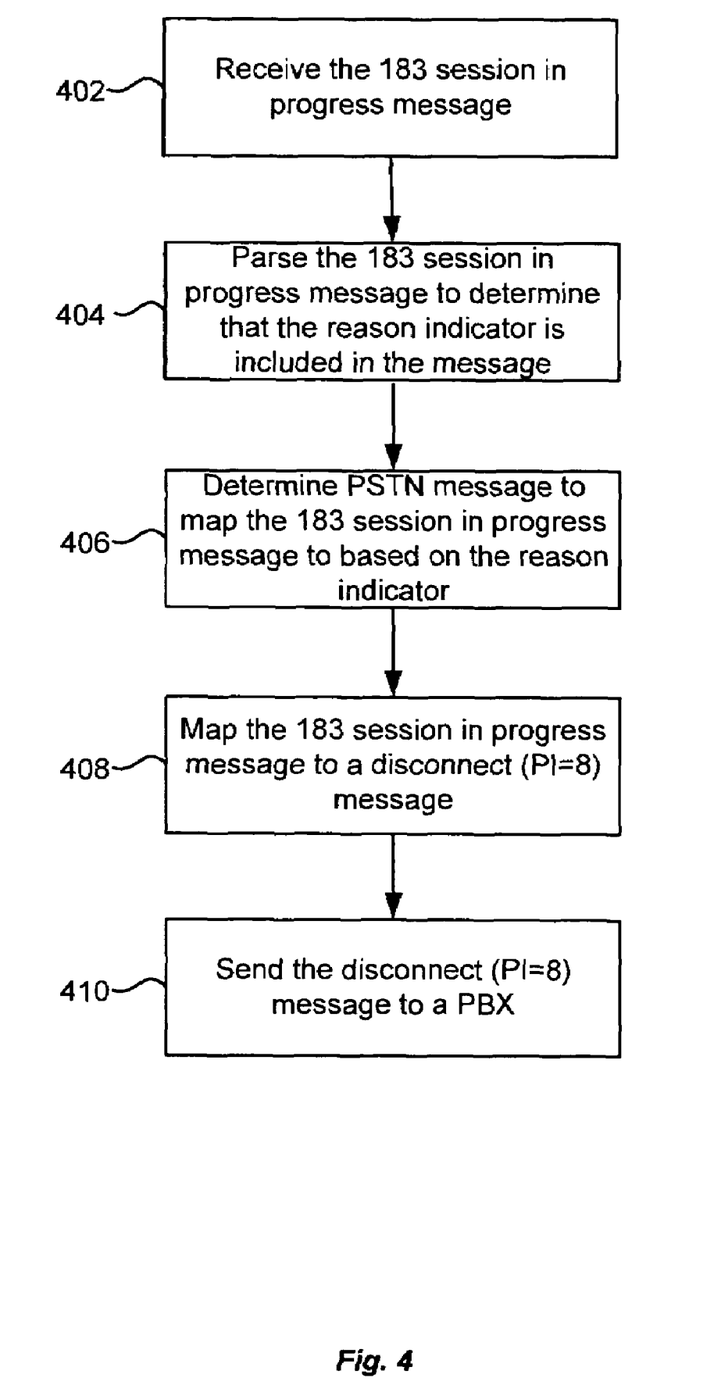
FIG. 4 illustrates an example method for processing a 183 session-in-progress message with a reason indicator.

When PBX 102-1 receives the 183 session in progress message, it is parsed to determine if a reason indicator is included. FIG. 4 illustrates an example method for processing a 183 session-in-progress message with a reason indicator.

In step 402, originating gateway 104 receives the 183 session in progress message. In step 404, originating gateway 104 parses the 183 session in progress message to determine that the reason indicator is included in the message. This indicates to originating gateway 104 that this is different from a 183 session in progress message that just wants to establish a voice path.

In step 406, originating gateway 104 determines a PSTN message to map the 183 session in progress to based on the reason header. In this case, originating gateway 104 knows that a disconnect (PI=8) message was received at terminating gateway 106.

In step 408, originating gateway 104 maps the 183 session in progress message to a disconnect (PI=8) message. Accordingly, this message indicates that a disconnect was desired but PBX 102-2 also wants to play an in-band announcement.

In step 410, originating gateway 104 sends the disconnect (PI=8) message to PBX 102-1. This message is sent using the PSTN protocol.

Figure 5:
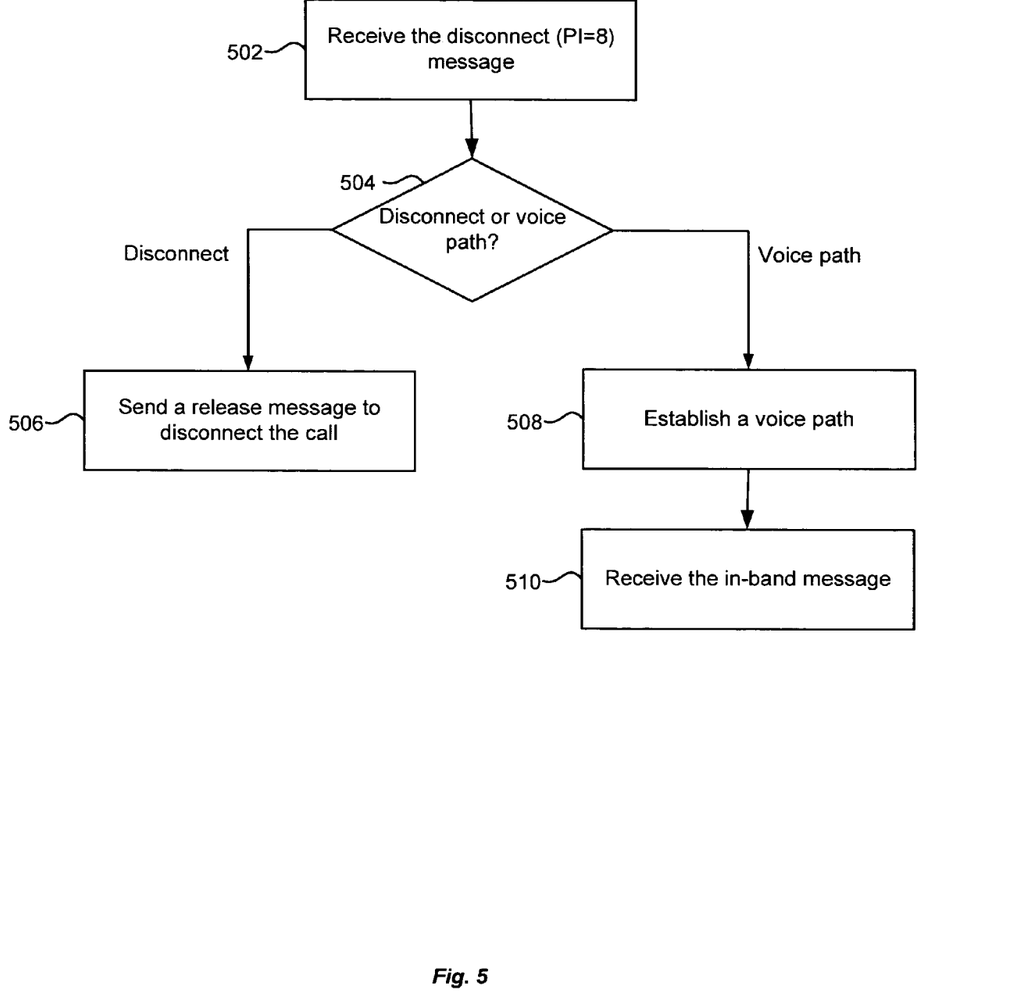
FIG. 5 illustrates an example method for processing a disconnect (PI=8) message.

FIG. 5 illustrates an example method for processing a disconnect (PI=8) message. In step 502, PBX 102-1 receives the disconnect (PI=8) message.

In step 504, PBX 102-1 determines if the call should be disconnected or if a voice path should be established to listen to the in-band announcement. If the call should be disconnected, in step 506, PBX 102-1 sends a release message to disconnect the call. In this case, a voice path is not established and the in-band announcement is not listened to.

If PBX 102-1 decides to listen to the in-band announcement, in step 508, PBX 102-1 establishes a voice path. This voice path may be between PBX 102-1 and PBX 102-2 through originating gateway 104 and terminating gateway 106.

In step 510, PBX 102-1 receives the in-band announcement. PBX 102-1 then forwards the in-band announcement to end device 108-1. Accordingly, end device 108-1 can listen to the in-band announcement. After the in-band announcement is listened to, the call may be disconnected.

Figure 6:
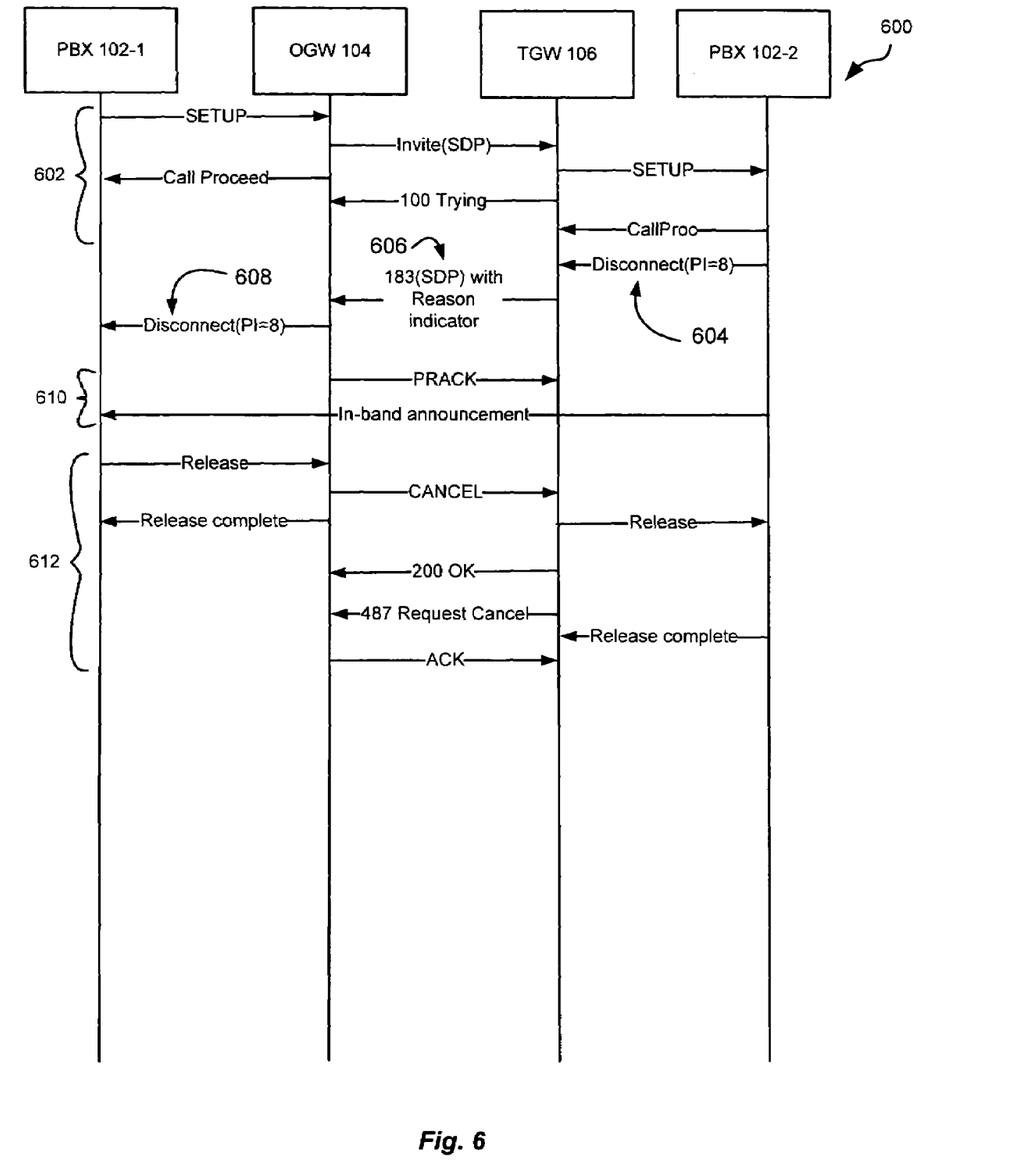

FIG. 6 illustrates an example call flow in which an in-band announcement is listened to. In this call flow, PBX 102-1 chooses to listen to the in-band announcement.

In a call flow 602, messages are sent to set up a call. As shown, PSTN messages may be sent from PBX 102-1 to originating gateway 104. Originating gateway 104 may interwork the PSTN messages to SIP messages, which are sent to terminating gateway 106. Terminating gateway 106 then sends PSTN messages to PBX 102-2.

In a call flow 604, PBX 102-2 sends a disconnect (PI=8) message to terminating gateway 106. In a call flow 606, terminating gateway 106 sends a 183 session in progress message. This message includes a reason indicator in the reason-header field. In a call flow 608, originating gateway 104 receives the 183 session in progress message and interworks it to a disconnect (PI=8) message.

In a call flow 610, originating gateway 104 may send a PRACK to terminating gateway 106. And then, the in-band announcement may be sent from PBX 102-2 to PBX 102-1. PBX 102-1 may then forward the in-band announcement to end device 108-1.

In call flow 612, PBX 102-1 sends a release message to originating gateway 104. The release message is interworked into a CANCEL message in SIP. Terminating gateway 106 then sends a release message to PBX 102-2 and originating gateway 104 sends a release complete message to PBX 102-1. Terminating gateway 106 can also send a 200 OK and 487 Request Cancel message, and originating gateway 104 sends an ACK in response. PBX 102-2 also sends a release complete message.

Accordingly, end device 102-1 can listen to the in-band announcement. And then, either side may initiate the disconnect. In this case, PBX 102-1 initiated the disconnect, but PBX 102-2 may also initiate the disconnect.

Figure 7:
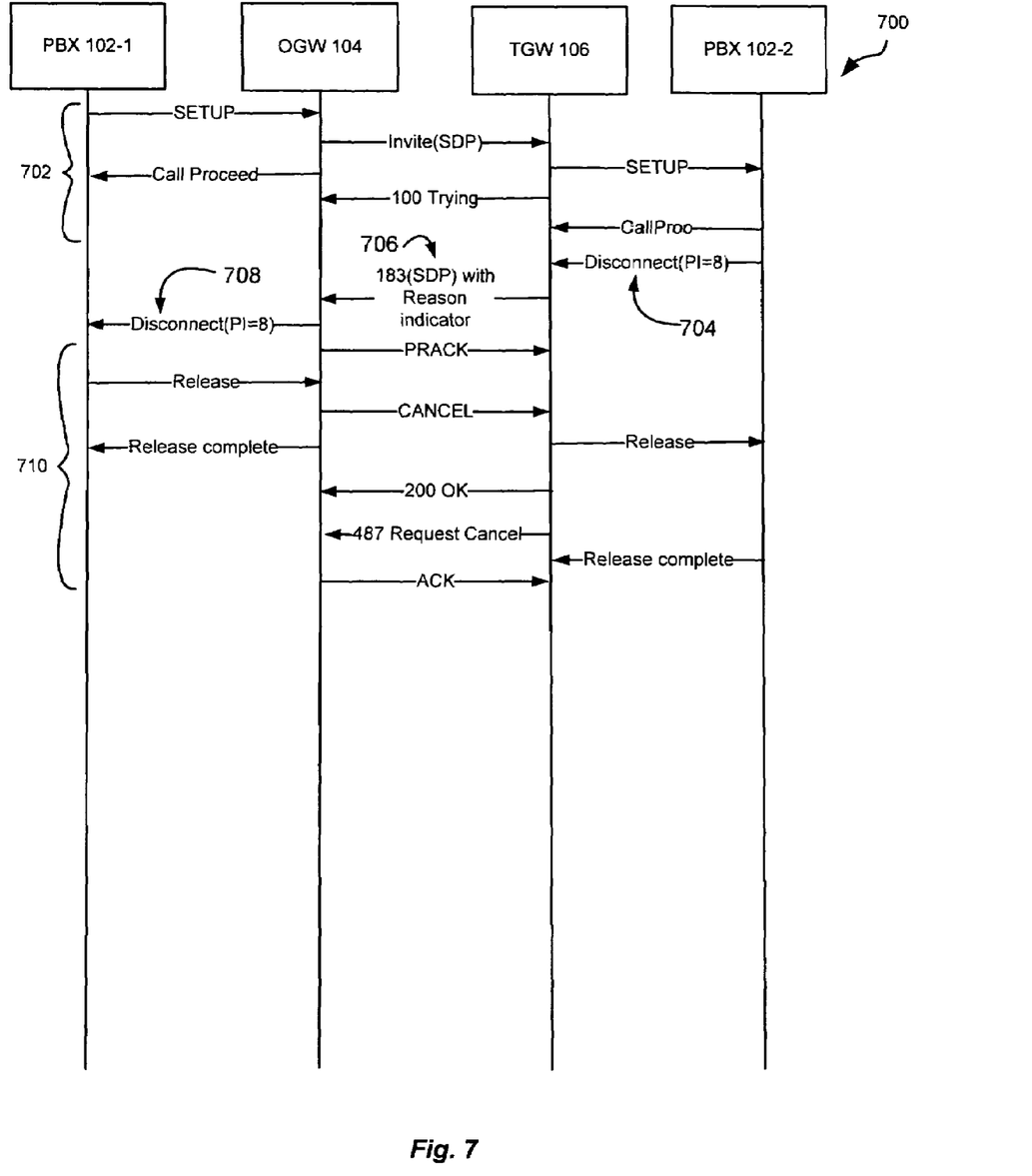

FIG. 7 illustrates an example call flow in which an in-band announcement is not listened to. In a call flow 702, messages are sent to set up a call. As shown, messages may be sent from PBX 102-1 to originating gateway 104. Originating gateway 104 may interwork the PSTN messages to SIP messages, which are sent to terminating gateway 106. Terminating gateway 106 then sends PSTN messages to PBX 102-2.

In a call flow 704, PBX 102-2 sends a disconnect (PI=8) message to terminating gateway 106. At 706, terminating gateway 106 sends a 183 session in progress message. This message includes a reason indicator in the reason-header field.

In a call flow 708, originating gateway 104 receives the 183 session in progress message and interworks it to a disconnect (PI=8) message.

In a call flow 710, PBX 102-1 sends a release message to originating gateway 104. The release message is interworked into a CANCEL message in SIP. Terminating gateway 106 then sends a release message to PBX 102-2 and originating gateway 104 sends a release complete message to PBX 102-1. Terminating gateway 106 can also send a 200 OK and 487 Request Cancel message, and originating gateway 104 sends an ACK in response. PBX 102-2 also sends a release complete message.

Accordingly, the call is disconnected instead of establishing a voice path for the in-band announcement. Thus, end device 108-1 is given the option to disconnect the call and does not have to listen to the in-band announcement.

Figure 8:
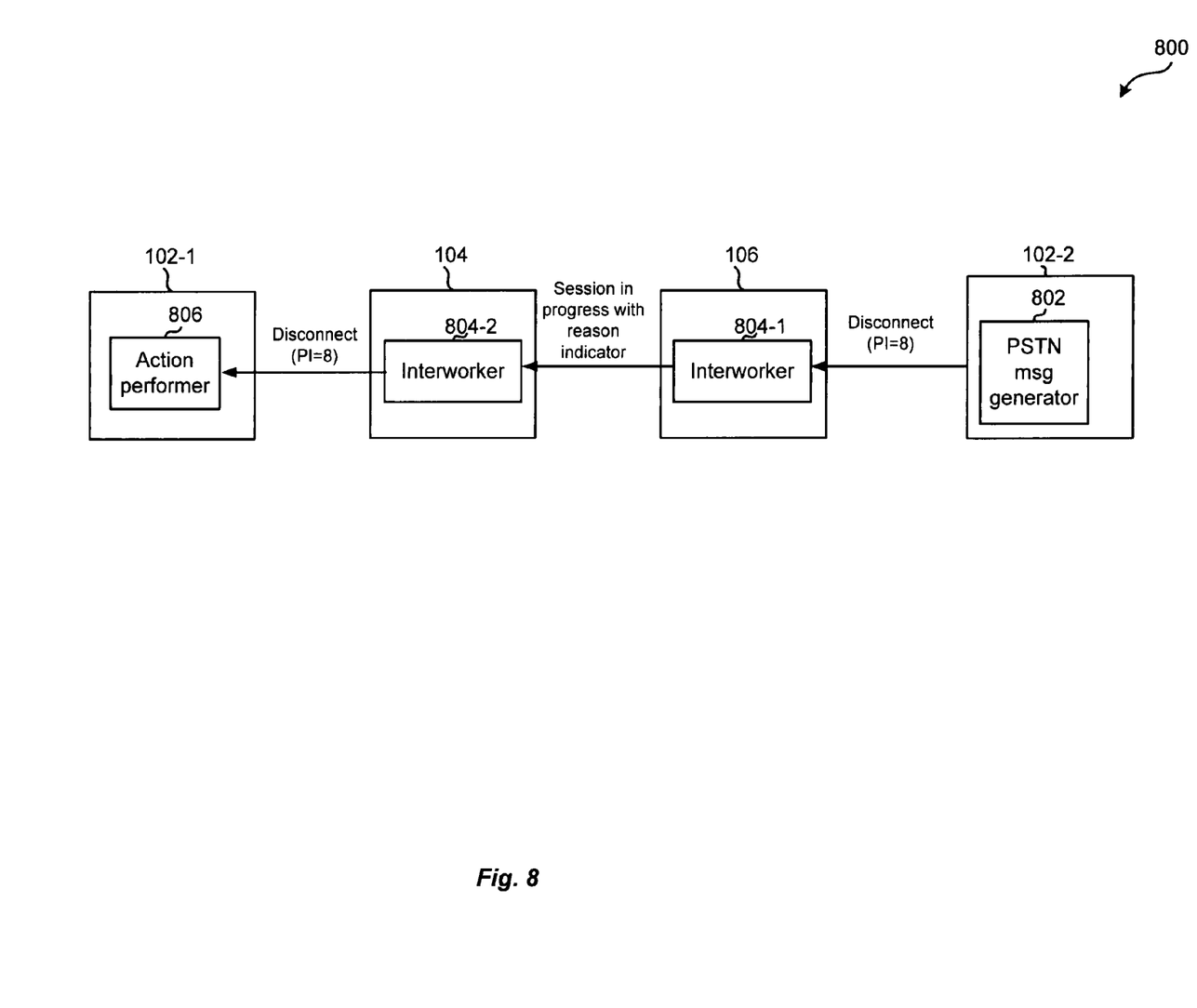
FIG. 8 illustrates another example system for providing SIP-PSTN interworking.

FIG. 8 illustrates another example system for providing SIP-PSTN interworking. As shown, a PSTN message generator 802 is configured to generate a disconnect (PI=8) message. This message is sent to terminating gateway 106.

An interworker 804-1 is configured to interwork the disconnect (PI=8) message to a 183 session in progress message. A reason indicator is included in the 183 session in progress message. Interworker 804-1 sends this message to originating gateway 104.

An interworker 804-2 receives a 183 session in progress message and determines that a reason indicator is included in it. Interworker 804-2 then generates a disconnect (PI=8) message and sends it to PBX 102-1.

An action performer 806 then performs an action, such as establishing a voice path to listen to an in-band announcement or disconnecting the call.

Particular embodiments provide many advantages. For example, the option to establish a voice path and listen to the in-band announcement or disconnect a call is provided. This provides extra flexibility rather than having the only option as establishing a voice path and listening to the in-band announcement. This may save bandwidth as calls may be disconnected if it is desired.

Although the invention has been described with respect to specific particular embodiments thereof, these particular embodiments are merely illustrative, and not restrictive of the invention. For example, although SIP is described, it will be recognized that other protocols may be appreciated. Also, messages other than a disconnect with progress indicator may be appreciated.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic may be stored in an information storage medium, such as a computer-readable medium, as a plurality of instructions adapted to direct an information processing device to perform a set of steps disclosed in particular embodiments. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "a particular embodiment", "an embodiment", "a specific embodiment" or a "particular embodiment" means that a particular feature, structure, or characteristic described in connection with the embodiment is included in at least a particular embodiment and not necessarily in all particular embodiments. Thus, respective appearances of the phrases "in a particular embodiment", "in an embodiment", "in a specific embodiment", or a "particular embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope of the present invention.

Particular embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated particular embodiments and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of particular embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:

receiving a first PSTN message including a progress indicator from a PSTN device;

determining a reason indicator for the first PSTN message including a progress indicator, the generating a SIP message including the reason indicator, the reason indicator indicating that the SIP message is mapped from the first PSTN message that includes the progress indicator; and sending the SIP message with the reason indicator, wherein a receiving device that receives the SIP message with the reason indicator can interwork the SIP message with the reason header to a corresponding PSTN message with the progress indicator.

2. The method of claim 1, wherein an option to disconnect or listen to an in-band announcement is provided to the receiving device based on the corresponding PSTN message.

3. The method of claim 1, wherein the reason indicator is included in a reason header of the SIP message.

4. The method of claim 1, further comprising:

receiving a first release message to disconnect a call in the SIP protocol in response to sending the SIP message with the reason indicator.

5. A method comprising:

receiving a SIP message;

determining a reason indicator in the SIP message, the reason indicator indicating that the SIP message is mapped from a first PSTN message that includes a progress indicator;

interworking the SIP message into a corresponding PSTN message with a progress indicator based on the reason indicator; and sending the corresponding PSTN message with the progress indicator, wherein a receiving device that receives the corresponding PSTN message with the progress indicator can perform an action based on the corresponding PSTN message with the progress indicator.

6. The method of claim 5, wherein the action comprises disconnecting a call or listening to an in-band announcement is provided to the receiving device based on the corresponding PSTN message.

7. The method of claim 5, wherein the reason indicator is included in a reason header of the SIP message.

8. The method of claim 5, further comprising:
sending a first release message to disconnect a call in the SIP protocol in response to receiving the SIP message with the reason indicator.

9. An apparatus comprising:
one or more processors; and
a memory containing instructions that, when executed by the one or more processors, cause the one or more processors to perform a set of steps comprising:
receiving a first PSTN message including a progress indicator from a PSTN device;
determining a reason indicator for the first PSTN message including a progress indicator, the
generating a SIP message including the reason indicator, the reason indicator indicating that the SIP message is mapped from the first PSTN message that includes the progress indicator; and
sending the SIP message with the reason indicator, wherein a receiving device that receives the SIP message with the reason indicator can interwork the SIP message with the reason header to a corresponding PSTN message with the progress indicator.

10. The apparatus of claim 9, wherein the instructions cause the one or more processors to provide an option to disconnect or listen to an in-band announcement to the receiving device based on the corresponding PSTN message.

11. The apparatus of claim 9, wherein the reason indicator is included in a reason header of the SIP message.

12. The apparatus of claim 9, wherein the instructions cause the one or more processors to perform a further step comprising:
receiving a first release message to disconnect a call in the SIP protocol in response to sending the SIP message with the reason indicator.

13. An apparatus comprising:
one or more processors; and
a memory containing instructions that, when executed by the one or more processors, cause the one or more processors to perform a set of steps comprising:
receiving a SIP message;
determining a reason indicator in the SIP message, the reason indicator indicating that the SIP message is mapped from a first PSTN message that includes a progress indicator;
interworking the SIP message into a corresponding PSTN message with a progress indicator based on the reason indicator; and
sending the corresponding PSTN message with the progress indicator, wherein a receiving device that receives the corresponding PSTN message with the progress indicator can perform an action based on the corresponding PSTN message with the progress indicator.

14. The apparatus of claim 13, wherein the instructions cause the one or more processors to provide an option to disconnect a call or listening to an in-band announcement to the receiving device based on the corresponding PSTN message.

15. The apparatus of claim 13, wherein the reason indicator is included in a reason header of the SIP message.

16. The apparatus of claim 13, wherein the instructions cause the one or more processors to perform a further step comprising:
sending a first release message to disconnect a call in the SIP protocol in response to receiving the SIP message with the reason indicator.

17. An apparatus comprising:
means for receiving a first PSTN message including a progress indicator from a PSTN device;
means for determining a reason indicator for the first PSTN message including a progress indicator, the
means for generating a SIP message including the reason indicator, the reason indicator indicating that the SIP message is mapped from the first PSTN message that includes the progress indicator; and
means for sending the SIP message with the reason indicator, wherein a receiving device that receives the SIP message with the reason indicator can interwork the SIP message with the reason header to a corresponding PSTN message with the progress indicator.

18. An apparatus comprising:
means for receiving a SIP message;
means for determining a reason indicator in the SIP message, the reason indicator indicating that the SIP message is mapped from a first PSTN message that includes a progress indicator;
means for interworking the SIP message into a corresponding PSTN message with a progress indicator based on the reason indicator; and
means for sending the corresponding PSTN message with the progress indicator, wherein a receiving device that receives the corresponding PSTN message with the progress indicator can perform an action based on the corresponding PSTN message with the progress indicator.

* * * * *